E. M. DEEMS.
BONDING PIN.
APPLICATION FILED MAY 13, 1916.
1,225,781. Patented May 15, 1917.
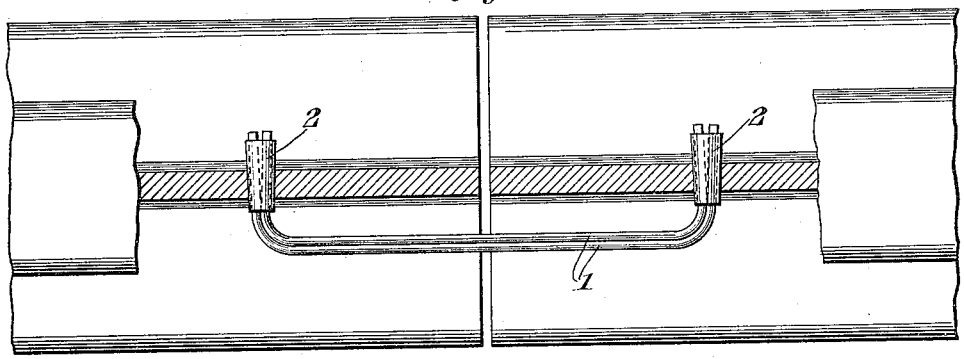
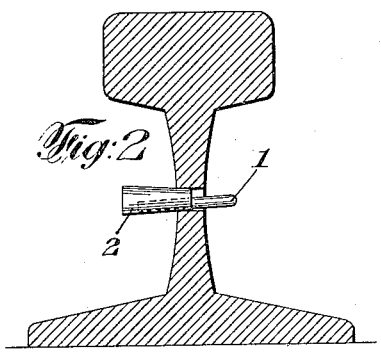 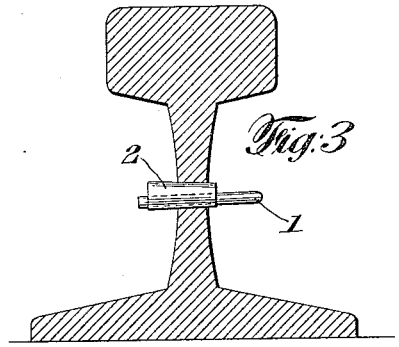
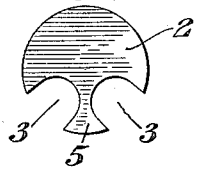 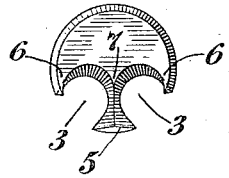
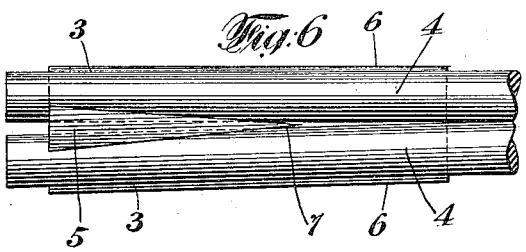 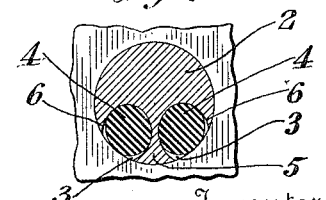
Inventor
Edward M. Deems,
By his Attorneys
Davis & Davis

UNITED STATES PATENT OFFICE.

EDWARD M. DEEMS, OF FOREST HILLS, NEW YORK, ASSIGNOR TO DUPLEX CHANNEL PIN COMPANY, INC., A CORPORATION OF NEW YORK.

BONDING-PIN.

1,225,781.     Specification of Letters Patent.     Patented May 15, 1917.

Application filed May 13, 1916. Serial No. 97,266.

*To all whom it may concern:*

Be it known that I, EDWARD M. DEEMS, a citizen of the United States, and resident of Forest Hills, county of Queens, State of New York, have invented certain new and useful Improvements in Bonding-Pins, of which the following is a specification.

This invention relates to bonding pins for the attachment of bonding wires to railroad rails, and relates particularly to a bonding pin adapted for attaching the ends of two bonding wires to a rail in one operation thereby avoiding the expense of individually securing the two bonding wires.

The main object of the invention is to provide a tapered, double-wire bonding pin having two longitudinally extending wire-receiving grooves, said grooves being separated from each other at the larger end of the pin by a web integral with the pin, the said two grooves converging and merging into practically one groove at the smaller end of the pin, a slight ridge being formed between the two grooves where said grooves merge into each other, said ridge being due to the curvature of the bottom of the grooves. By reason of this construction the wires at the smaller end of the pin, and from about the middle of the pin, will be forced closely together and into intimate contact with each other when the pin is driven into the aperture in the rail. During the action of driving the pin the edges of the channels will be forced inwardly into close gripping contact with the wires, and the pin and the wires will be so crushed and distorted as to practically fill the aperture in the rail. By arranging the wires in individual grooves at the larger end of the pin said wires are given a greater surface contact with the pin and are very securely locked to the rail. The V-shaped rib or web between the diverging grooves at the larger end of the pin serves as a lock to lock the bonding wires in place.

Another object of the invention is to form the wire-receiving grooves in the under side of the pin so that when the pin is driven into the rail the upper solid surface thereof forms a cover or protector for that portion of the wires engaged by the pin, so that moisture and dirt will not settle in the grooves. By this arrangement a large portion of the rusting of the wires in the grooves of the pins is avoided.

By arranging the two wires in close contact with each other at the smaller end of the pin and forcing or crowding the edges of the said groove over the wires, by driving the pin into the aperture in the rails, the wires are strengthened and braced at the smaller end of the pin and are consequently better adapted to withstand the vibrations due to the passing trains.

There are other important objects and advantages of the invention which will be apparent to one skilled in the art, and which need not be particularly herein recited.

In the drawing, Figure 1 is a longitudinal horizontal sectional view through the end portions of two rails showing the invention applied thereto;

Fig. 2 a transverse vertical sectional view of one rail showing the bonding wires and the bonding pin in position before the pin is driven into the rail aperture;

Fig. 3 a view similar to Fig. 2 showing the bonding pin driven into the rail;

Fig. 4 an end view of the bonding pin showing the larger end of the pin;

Fig. 5 a similar view showing the smaller end of the pin;

Fig. 6 a bottom plan view of the pin showing the wires in position therein; and

Fig. 7 a vertical sectional view through the pin in the rail, showing the wires in position.

Referring to the various parts by numerals, 1 designates the bonding wires and 2 the bonding pin. The pin is formed with two longitudinally extending wire-receiving grooves 3 at its larger end, which grooves converge and, at about the middle of the pin, merge into a broad wire-receiving channel 4. Between the two wire-receiving grooves 3 is a wedge-shaped rib or web 5, said web tapering to a point where the two grooves 3 merge into the broad channel 4, this point being approximately at the middle of the pin, that is to say approximately midway between the ends of the pin. The side walls of the channel 4 are formed by comparatively thin longitudinally extending webs 6, said webs being curved on their outer surfaces to conform to the exterior of the pin, and said webs partially embracing the wires, as shown clearly in Figs. 5 and 7. The grooves 3 and the channel 4 are formed in the under side of the pin, that is to say when the pin is in position in the rail these grooves are on the under side, so that the solid ungrooved portion of the pin is uppermost and serves as a means to protect the wires and to prevent moisture and dirt entering the grooves and settling around the wires therein.

The grooves 3 converge toward the smaller end of the pin and the V-shaped separating web 5 tapers to practically nothing at about the middle of the pin. These grooves 3, however, are distinct and separate grooves in a sense, even after they merge and form the broad channel 4. The bottoms of the grooves are concave and form the ridge 7 between them, which ridge extends to the smaller end of the pin, as shown in Fig. 5, so that while the said grooves merge into and form practically a broad channel, the wires each have a distinct groove in which it lies. The wires are in close contact throughout the length of the broad channel, and, of course, this contact with each other and with the side walls of the grooves is increased and made more positive when the pin is driven into the aperture in the rails. The pin is made of soft material and there is a considerable distortion of it under the driving strains, so that it squeezes around the wires, and to a certain limited extent causes the wires to be distorted in order that they and the pin shall fill, or substantially fill, the aperture in the rail.

It is obvious from the construction of the pin that at the larger end thereof there will be a considerable solid body of metal to receive the hammer blows when driving the pin. It is also manifest that when the pin is being driven into the rail the comparatively thin curved walls 6 of the broad channel 4 will be forced inwardly around the wires, and will serve as clamping and gripping means to force said wires into intimate contact with each other as well as into intimate contact with the metal of the pin. It is also clear that by forming the two wire grooves 3 on the same side of the pin, narrow or thin side walls 8 will be formed throughout the length of said grooves. These thin side walls of the grooves 3 will also be crushed inwardly around the wires whenever the pin is driven far enough into the rail to cause said side walls to engage the wall of the aperture in the rail.

In operation the bonding wires are passed through the aperture in the rails and arranged in the bonding pins as illustrated in Fig. 2. The pins are then driven into the rail apertures, as indicated in Fig. 3, thereby causing the sides of the grooves to grip the wires, and locking the wires to the rails.

From the foregoing it is manifest that I provide a double-wire bonding pin of simple construction which may be readily applied and which, when in position, will effectually lock the wires to the rails and will force them into intimate contact with each other and with the bonding pins and the rails.

What I claim is:

1. A bonding pin consisting of a tapered body portion having a solid driving portion at one side thereof throughout the length of the pin, and having two wire receiving grooves formed in the opposite side thereof, said grooves converging and merging into a single channel as they approach the smaller end of the pin.

2. A bonding pin consisting of a tapering body portion having a solid driving portion at one side thereof extending throughout the length of the pin, and having a grooved wire-gripping portion at the opposite side thereof having two wire-receiving grooves formed therein, said grooves converging as they approach the smaller end of the pin and merging into a single broad channel at a point intermediate the ends of the pin.

3. A bonding pin consisting of a tapering body portion having a solid driving portion at one side thereof extending throughout the length of the pin, and having a grooved wire-gripping portion at the opposite side thereof having two longitudinal wire-receiving grooves formed therein, said grooves being separated by an intermediate wedge-shaped portion the width and height of which decreases toward the smaller end of the pin.

4. A bonding pin consisting of a tapering body portion having a solid driving portion at one side thereof extending throughout the length of the pin, and having a grooved wire-gripping portion at the opposite side thereof having two wire-receiving grooves formed therein, said grooves converging as they approach the smaller end of the pin and merging into a single wire-receiving channel so as to form a wedge-shaped web between the grooves throughout a portion of their length.

5. A bonding pin consisting of a tapering soft metal body portion having a solid driving portion at one side thereof extending throughout the length of the pin, and having a grooved wire-gripping portion at the opposite side thereof having two single-wire-receiving channels formed therein converging and merging into a broad two-wire-receiving channel as they approach the smaller end of the pin, said channels having thin deformable side walls adapted to be crushed tightly around the wires when the pin is driven into the rail.

In testimony whereof I hereunto affix my signature.

EDWARD M. DEEMS.

Copies of this patent may be obtained for five cents each, by addressing the "Commissioner of Patents, Washington, D. C."